United States Patent [19]
Kori et al.

[11] Patent Number: 5,778,064
[45] Date of Patent: Jul. 7, 1998

[54] APPARATUS AND METHOD FOR PROCESSING A HIGH DEFINITION VIDEO SIGNAL

[75] Inventors: Teruhiko Kori, Kanagawa; Tadashi Ezaki, Tokyo, both of Japan

[73] Assignee: Sony Corporation, Tokyo, Japan

[21] Appl. No.: 623,641

[22] Filed: Mar. 28, 1996

[30] Foreign Application Priority Data

Mar. 31, 1995 [JP] Japan .................................. 7-099559

[51] Int. Cl.$^6$ .......................... H04N 7/167; H04N 5/91; H04N 5/84
[52] U.S. Cl. .................. 380/5; 360/60; 386/37; 386/94; 386/123; 386/124
[58] Field of Search .................. 380/5; 360/60; 386/37, 94, 123, 124

[56] References Cited

U.S. PATENT DOCUMENTS

| | | | |
|---|---|---|---|
| 4,297,729 | 10/1981 | Steynor et al. | 360/40 |
| 5,535,275 | 7/1996 | Sugisaki et al. | 380/10 |
| 5,574,787 | 11/1996 | Ryan | 380/5 |

*Primary Examiner*—Stephen C. Buczinski
*Attorney, Agent, or Firm*—Frommer Lawrence & Haug LLP; William S. Frommer

[57] ABSTRACT

Digital video tape recorder which reproduces from a record medium a digital high definition video signal having copy-prevention data therein, extracts the copy-prevention data from the reproduced signal, generates from the extracted digital copy-prevention data an analog copy-inhibit signal that has the same data format as a copy-inhibit signal superimposed on a standard definition video signal, converts the reproduced digital high definition video signal to an analog signal, and superimposes the analog copy-inhibit signal onto the analog signal for output. To record a high definition video signal, the digital video tape recorder receives an analog high definition video signal that has superimposed thereon a copy-inhibit signal having the same data format as a copy-inhibit signal superimposed on a standard definition video signal, extracts the copy-inhibit signal from the received analog high definition video signal, supplies the received analog high definition video signal when that signal is not copy-protected, converts the supplied video signal to a digital signal, generates digital copy-prevention data from the extracted copy-inhibit signal, adds the digital copy-prevention data to the digital signal, and records on a record medium the digital signal with the digital copy-prevention data added thereto.

44 Claims, 8 Drawing Sheets

Fig. 1
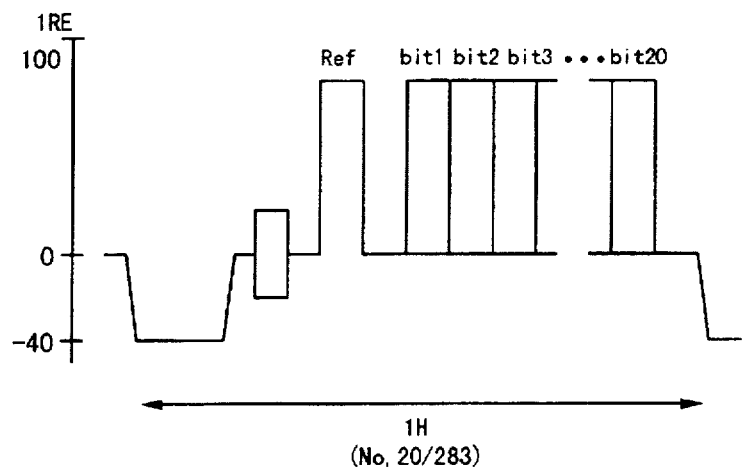
Fig. 2A
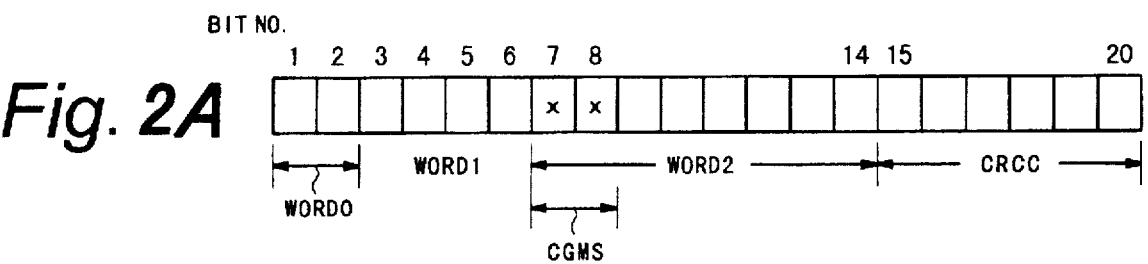
Fig. 2B
| BIT 7 | BIT 8 | DEFINITION |
|---|---|---|
| 1 | 1 | INVALID FOR COPY OPERATION |
| 1 | 0 | VALID FOR ONE COPY GENERATION |
| 0 | 1 | NOT USED |
| 0 | 0 | VALID FOR COPY OPERATION |

Fig. 4

| | MSB | | | | | | | LSB |
|---|---|---|---|---|---|---|---|---|
| PC0 | 0 | 1 | 1 | 0 | 0 | 0 | 0 | 1 |
| PC1 | CGMS || COPY SOURCE || COPY GENERATION || SS ||
| PC2 | RECORD START | 1 | RECORD MODE || 1 | DISPLAY |||
| PC3 | FF | FS | FC | IL | ST | SC | BCSYS ||
| PC4 | 1 | CATEGORY |||||||

Fig. 5

| | MSB | | | | | | | LSB |
|---|---|---|---|---|---|---|---|---|
| PC0 | 0 | 1 | 0 | 1 | 0 | 0 | 0 | 1 |
| PC1 | CGMS || COPY SOURCE || COPY GENERATION || SS ||
| PC2 | RECORD START | RECORD END | RECORD MODE || 1 | 1 | 1 | 1 |
| PC3 | DRF | SPEED |||||||
| PC4 | 1 | CATEGORY |||||||

1

APPARATUS AND METHOD FOR PROCESSING A HIGH DEFINITION VIDEO SIGNAL

BACKGROUND OF THE INVENTION

The present invention relates to a digital video tape recorder, and more particularly, to apparatus and method for processing a high definition video signal having copy prevention information included therein.

Video tape recorders that utilize an ID signal (commonly called a VBI signal) inserted into a vertical blanking interval of a video signal to prevent the recording or re-recording of the video signal currently are being developed. A VBI signal that indicates whether the video signal is either copy protected or not copy protected is inserted into the 20th line (i.e., horizontal interval) of the vertical blanking interval in the first field of a frame and also is inserted into the 283rd line of the vertical blanking interval in the second field of the frame.

Referring to FIG. 1 of the drawings, a VBI signal is shown to follow a horizontal synchronous signal and a color burst signal of a horizontal interval of a video signal. The VBI signal is comprised of a 2 bit reference signal followed by 20 bits (bit 1 . . . bit 20) of "digital" information. The reference signal has a value of 70 IRE units (on a voltage scale, an IRE unit is 1% of the range from white level to blanking), and the values of bits 1 to 20 are either 0 IRE or 70 IRE units. The 20 bits of digital information are encoded as an ID signal by setting a clock signal FC of both the reference signal and the digital signal to FC=FSC+8=447 KHZ, wherein FSC is the color subcarrier frequency.

Video transmission systems that transmit video signals that include a VBI signal containing copy prevention (or copy restriction) information therein are currently being developed. FIG. 2A illustrates the data structure of the 20 bits of digital information in the ID signal included in the transmitted video signal. The ID signal (or VBI signal, and also known as a VBI-A signal) is comprised of 14 bits of information data and 6 bits of correction code (CCRC), which is utilized to detect errors in the information data. Word 0 (bits 1 and 2) of the information data identifies the transmission format of the video signal, and word 1 (bits 3–6) is a "header" word that designates the type of information included in word 2. For example, a word 1 value of 0000 indicates that copy restriction information is contained in word 2. Word 2 is comprised of bits 7–14 and bits 7 and 8 thereof represent copy generation management system (CGMS) information which indicates whether the video signal is either fully copy protected, partially copy protected (i.e., only one copy can be made), or not copy protected. FIG. 2B is a table identifying the values of bits 7 and 8 for the different types of copy protection.

Video signal transmission systems which transmit CGMS information in a VBI signal of the video signal, as discussed above, transmit standard NTSC (525 line) video signals or standard PAL (625 line) video signals. However, such transmission systems generally are unable to transmit high definition (HD) video signals that include copy protection information and that are easily recorded and reproduced by digital video tape recorders.

OBJECTS OF THE INVENTION

Therefore, it is an object of the present invention to provide apparatus and method for processing high definition video signals which overcome the shortcomings of the above described devices.

Another object of the present invention is to provide apparatus and method for processing high definition video signals which include copy protection information.

A further object of the present invention is to provide apparatus and method for recording and reproducing high definition video signals which include copy protection data therein.

Various other objects, advantages and features of the present invention will become apparent to those of ordinary skill in the art, and the novel features will be particularly pointed out in the appended claims.

SUMMARY OF THE INVENTION

In accordance with one embodiment of the present invention, apparatus and method operate to receive a high definition video signal having copy-prevention information therein, extract the copy-prevention information from the high definition video signal, generate from the extracted copy-prevention information a copy-inhibit signal having a data format of a copy-inhibit signal superimposed on a standard definition video signal, and add the copy-inhibit signal to the high definition video signal (e.g., in a vertical blanking interval thereof).

As one aspect of the present invention, the high definition video signal is a digital signal, an analog copy-inhibit signal is generated from the extracted copy-prevention information, the digital signal is converted to an analog high definition video signal, and the analog copy-inhibit signal is superimposed onto the analog high definition video signal.

In accordance with another embodiment of the present invention, apparatus and method operate to extract from a high definition video signal a copy-inhibit signal having the same data format as a copy-inhibit signal superimposed on a standard definition video signal, supply the high definition video signal when the high definition video signal is not copy-protected, generate from the extracted copy-inhibit signal copy-prevention data that has a data format different than the data format of the copy-inhibit signal, and combine the copy-prevention data and the supplied high definition digital video signal for output.

As an aspect of the present invention, the high definition video signal is an analog signal, digital copy-prevention data is generated from the extracted copy-inhibit signal, and the supplied high definition video signal is converted to a digital signal and combined with the digital copy-prevention data.

In accordance with a further embodiment of the present invention, apparatus and method operate to reproduce a digital high definition video signal from a record medium, extract digital copy-prevention data therefrom, generate from the extracted digital copy-prevention data an analog copy-inhibit signal that has the same data format as a copy-inhibit signal superimposed on a standard definition video signal, convert the reproduced digital high definition video signal to an analog signal, and superimpose the analog copy-inhibit signal onto the analog signal.

In accordance with still another embodiment of the present invention, apparatus and method operate to receive an analog high definition video having superimposed thereon a copy-inhibit signal having the same data format as a copy-inhibit signal superimposed on a standard definition video signal, extract the copy-inhibit signal from the received analog high definition video signal, supply the received analog high definition video signal when the received analog high definition video signal is not copy-protected, convert the supplied high definition video signal to a digital signal, generate from the extracted copy-inhibit signal digital copy-prevention data, add the digital copy-prevention data to the digital signal, and record on a record medium the digital signal with the digital copy-prevention data added thereto.

BRIEF DESCRIPTION OF THE DRAWINGS

The following detailed description, given by way of example and not intended to limit the present invention solely thereto, will best be appreciated in conjunction with the accompanying drawings, wherein like references numerals denote like elements and parts, in which:

FIG. 1 is a waveform diagram of a horizontal line interval having a VBI signal inserted therein;

FIGS. 2A and 2B illustrate the data structure of a VBI signal;

FIG. 4 illustrates the data structure of a VAUX data pack that identifies the type of copy protection of the video signal;

FIG. 5 illustrates the data structure of an AAUX data pack that identifies the type of copy protection of the audio signal;

DETAILED DESCRIPTION OF THE CERTAIN PREFERRED EMBODIMENTS

Figure 3A:
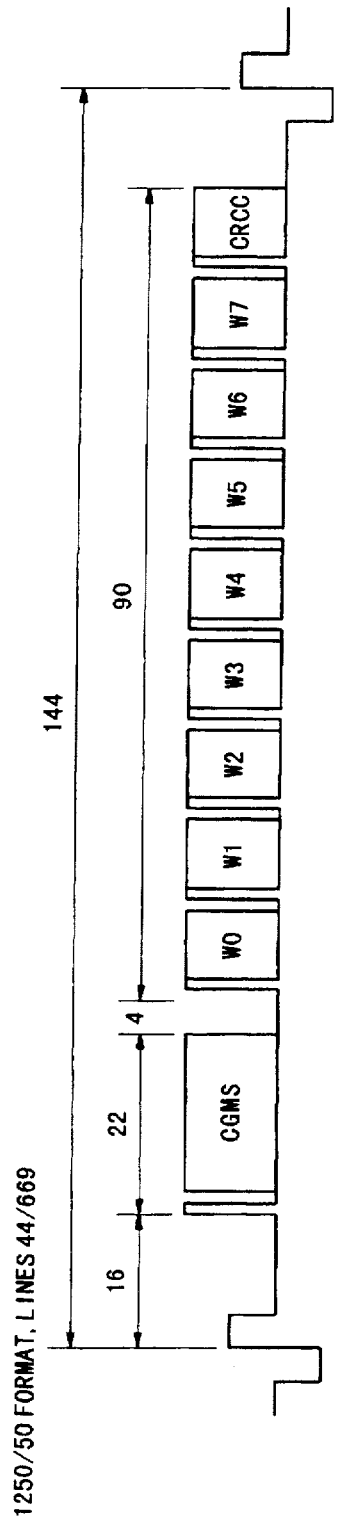
FIGS. 3A and 3B are exemplary waveform diagrams of analog HD signals in accordance with the present invention.
Figure 3B:
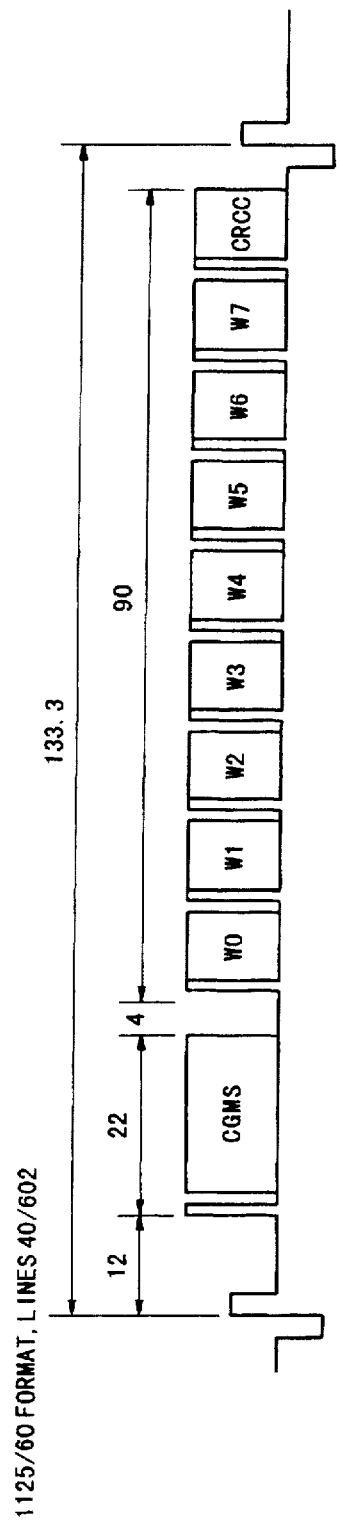

Referring now to FIGS. 3A and 3B of the drawings, VBI signals inserted into analog high definition (HD) signals of two different formats are shown. FIG. 3A illustrates a VBI signal inserted into an HD signal having a 1250 lines/50 fields format, wherein the VBI signal is inserted into the 44th horizontal region (line) of the first field of a frame and also is inserted into the 669th horizontal region of the second field of the frame. In the 1250 lines/50 field HD format, 144 samples (i.e., bits) are inserted at a sampling frequency of 4.5 MHz (13.5 MHz÷3=4.5 MHz), and therefore, the sampling frequency of the VBI signal and the 40.5 MHz sampling rate of the HD signal have an integral relationship (i.e. 4.5×9=40.5).

As shown in FIG. 3A, a horizontal line of the HD signal is comprised of a horizontal synchronous (sync) signal followed by a 16 bit blanking region, a two bit reference signal, 20 bits of CGMS data, a four bit blanking region and a 90 bit "word" region (to be described). The CGMS data has the same data format as the VBI signal inserted into a standard video signal, such as shown in FIGS. 2A, 2B previously discussed. However, the CGMS data in an HD signal is an NRZ signal in which the "0" and "1" data corresponds to "low" and "high" levels, respectively, and the bit transmission rate of the CGMS data in an HD signal is 2.25 MHz (4.5 MHz÷2=2.25 MHz). Bits 7 and 8 of word 2 of the CGMS data identify the type of copy protection of the HD signal. The CRC code (CRCC) of the CGMS data is generated using the polynomial: $G(x)=x^6+x+1$.

The 90 bit "word" region is comprised of eight 8-bit data words W0–W7 followed by an 8-bit CRC code (CRCC) word used to detect and correct errors in the data words. A two bit synchronous bit pattern (e.g., "01") precedes the CRC code word and each data word W0–W7. The CRC code word is generated using the polynomial: $G(x)=x^8+1$.

The 90 bit word region of the VBI signal is provided generally for storing identification data including the date and time at which video images in the HD signal are generated and/or recorded, temperature data, positional information that identify the latitude and longitude at which photographs were taken. The 90 bit word region may also include data pertaining to the title of a broadcast program, the date on which a program was recorded, the broadcast channel from which the program was recorded, etc. Although a specific embodiment is described herein, the VBI signal may be inserted into other horizontal lines of the HD signal, and words W0–W7 may be inserted into other areas of the vertical blanking interval of the HD signal.

FIG. 3B illustrates a VBI signal inserted into an HD signal having an 1125 lines/60 field format. The VBI signal shown in FIG. 3B has the same data structure as a VBI signal inserted into an HD signal having a 1250 line/50 field format, except the VBI signal has a data length of 133.3 bits in the 1125 line/60 field format.

In accordance with the present invention, the above discussed CGMS data is stored as auxiliary (AUX) data in a digital HD signal. A digital HD signal is comprised of video data, audio data, and subcode data. The video data generally includes image information and video auxiliary (VAUX) data, the audio data generally includes audio (i.e. sound) information and audio auxiliary (AAUX) data, and the subcode data includes system information. The CGMS data is stored in VAUX and AAUX data "packs" in the digital HD signal, to be described.

FIGS. 4 and 5 illustrate the data structure of VAUX and AAUX data packs, respectively, having CGMS data included therein. Referring first to FIG. 4, the data structure of a VAUX data pack is shown in which the first byte, called the "header", has a value of "01100001" or 61h ("h" representing hexadecimal notation). A VAUX data pack (and for purposes herein, all packs) is comprised of 5 bytes of data PC0–PC4, wherein byte PC0 is the pack's header and bytes P1–PC4 contain the pack's data. CGMS data is stored as bits 0 and 1 of byte PC1, and is defined as follows:

00: Valid copy operation (not copy protected)

01: Not used

10: Valid for only 1 copy operation (partially copy protected)

11: Invalid copy operation (fully copy protected)

It is seen that the above definition of CGMS data stored in a VAUX data pack is the same as the definition of CGMS data included in a VBI signal of an analog HD signal, as shown in FIG. 2B, previously discussed.

Byte PC1 of the VAUX data pack also includes copy source information (bits 2–3), as defined as follows:

00: Copy operation by analog input

01: Copy operation by digital input

10: Reserved

11: No information

And, byte PC1 includes copy generation data (bits 4–5), as defined as follows:
00: First generation
01: Second generation
10: Third generation
11: Fourth generation FIG. 5 illustrates the data structure of an AAUX data pack that includes copy protection information for the audio signal included in the digital HD signal. The pack header (i.e., the first byte) of the AAUX data pack is "01010001" or 51H, and bytes PC1–PC4 of the AAUX data pack have the same data structure as bytes PC1–PC4 of the VAUX data pack shown in FIG. 4, discussed above.

Figure 6:
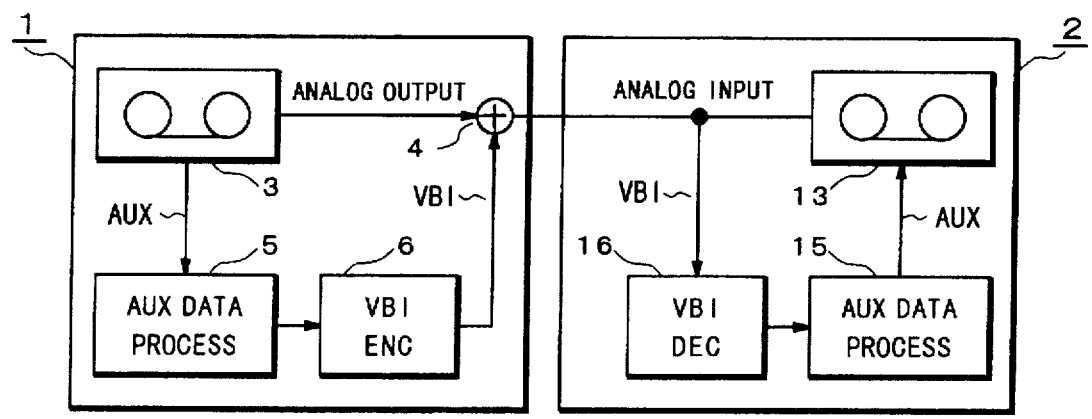
FIG. 6 is a block diagram of apparatus for recording and reproducing a high definition video signal in accordance with the present invention.

FIG. 6 is a block diagram of two digital video tape recorders 1 and 2 embodying the present invention. Video tape recorder (VTR) 1 operates to reproduce a digitally recorded HD video signal from a magnetic tape, and VTR 2 operates to record a HD video signal onto a magnetic tape.

VTR 1 is comprised of a head mechanism 3 (which includes a magnetic tape therein), a mixing circuit 4, an auxiliary data processing circuit 5 and a VBI signal encoder 6.

Head mechanism 3 reproduces from a magnetic tape a digital high definition video signal, converts the reproduced digital HD signal to an analog HD signal, and supplies the analog HD signal to mixing circuit 4. Head mechanism 3 also supplies the reproduced digital HD signal (in digital format) to auxiliary data processing circuit 5 which extracts the video auxiliary (VAUX) data and the audio auxiliary (AAUX) data therefrom, further extracts the CGMS data from both the VAUX and AAUX data, and supplies the extracted CGMS data to VBI encoder 6. VBI encoder 6 generates from the CGMS data an analog VBI signal having included therein the CGMS data, such as shown in FIG. 1, and supplies the VBI signal to mixing circuit 4 which combines the VBI signal with the analog HD signal supplied from head mechanism 3. VTR 1 supplies the resultant analog HD signal to VTR 2.

VTR 2 is comprised of a head mechanism 13, an auxiliary data processing circuit 15, a VBI signal decoder 16 and a recording signal processing circuit (not shown in FIG. 6). The analog HD signal is supplied to head mechanism 13 via the recording signal processing circuit and also is supplied to VBI decoder 16. VBI decoder 16 extracts the VBI signal from the analog HD signal, extracts the CGMS information therefrom and supplies the CGMS information to auxiliary data processing circuit 15. Auxiliary data processing circuit 15 modifies the CGMS information, if necessary (to be discussed), produces packs of data having the data structures shown in FIGS. 4 and 5, and supplies the produced data packs to the recording signal processing circuit which processes the analog HD signal and controls whether the analog HD signal, combined with the data packs, is recorded on a magnetic tape by head mechanism 13, to be further discussed.

Auxiliary data processing circuit 15 modifies the CGMS data when that data, which was extracted from the VBI signal, indicates that the analog HD signal can be copied one time (i.e., is partially copy protected). When the CGMS data has the bit value "10" (see FIG. 2), data processing circuit 15 changes the CGMS data to the value "11," which represents that the HD signal that is to be recorded on the magnetic tape is copy protected. If, on the other hand, the CGMS data indicates that the HD signal is either fully copy protected (i.e., 11) or not copy protected (i.e., 00), the CMGS data is unchanged. Auxiliary data processing circuit 15 supplies to the recording signal processing circuit an indication of whether the HD signal is recordable (i.e., the original CGMS data is either 00 or 10), or whether the HD signal is not recordable (i.e., the original CGMS data is 11). If the originally supplied HD signal is not fully copy protected, the analog HD signal is converted to a digital HD signal, is combined with the data packs supplied from auxiliary data processing circuit 15, and is recorded on a magnetic tape by head mechanism 13.

Figure 7:
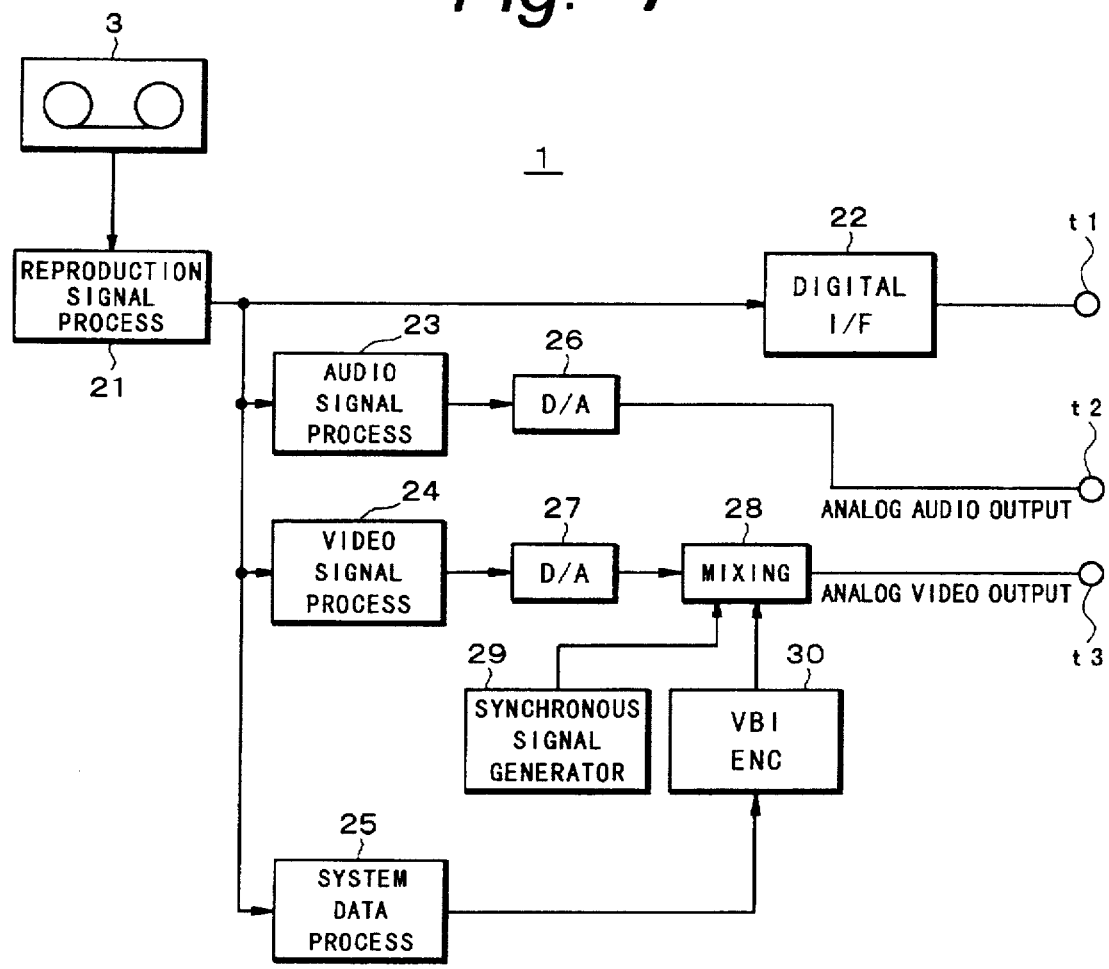
FIG. 7 is a detailed block diagram of apparatus for reproducing a high definition video signal in accordance with the present invention.
Figure 8:
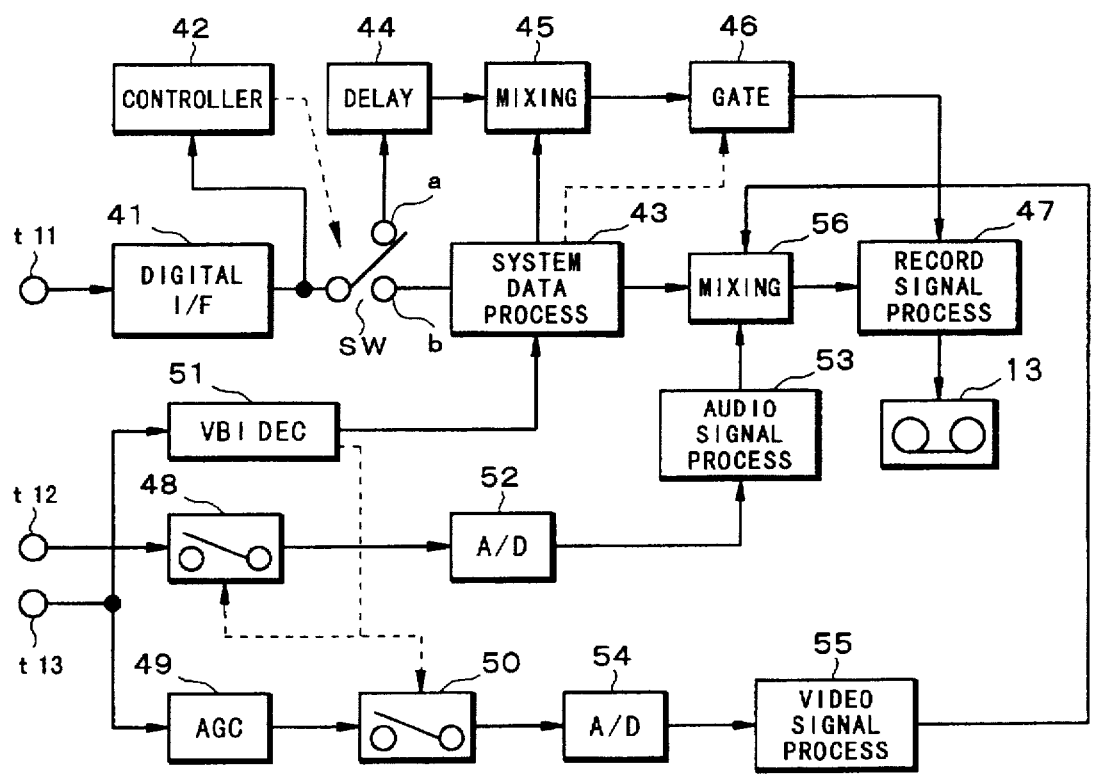
FIG. 8 is a detailed block diagram of apparatus for recording a high definition video signal in accordance with the present invention.

FIGS. 7 and 8 are detailed block diagrams of video tape recorders 1 and 2, respectively. Referring first to FIG. 7, head mechanism 3 reproduces a digital HD signal from a magnetic tape in which one frame of the recorded digital HD signal is stored in 20 tracks thereon in the 1125 line/60 field format, and is stored in 24 tracks thereon in the 1250 line/50 field format. Each track recorded on the magnetic tape includes a video area, an audio area and a subcode area in which video data, audio data and subcode data, respectively, are recorded, and wherein the video and audio areas include VAUX and AAUX data, respectively. And, as previously discussed, the VAUX, AAUX and subcode data are stored in packs of data having a common pack structure.

The reproduced digital HD signal is supplied to a reproduction signal processing circuit 21 which includes therein, a reproducing amplifier, a demodulating circuit and a data separating circuit which separates the video, audio and subcode data. Reproduction signal processing circuit 21 supplies the reproduced digital HD signal to a digital interface (I/F) 22 which converts the digital HD signal to a bit stream and outputs the bit stream at output terminal t1. Reproduction signal processing circuit 21 supplies the audio data, video data and system data, which includes the VAUX, AAUX and subcode data, to processing circuits 23, 24 and 25, respectively. In an alternative embodiment, reproduction signal processing circuit 21 supplies the entire reproduced HD signal to audio signal processing circuit 23, video signal processing circuit 24 and system data processing circuit 25 which extract the audio data, the video data and the system data, respectively, from the reproduced HD signal.

Audio signal processing circuit 23 corrects errors in the audio data and de-shuffles the audio data in a manner well-known in the art, and supplies the resultant audio data to a digital to analog (D/A) converter 26. D/A converter 26 converts the digital audio data to an analog audio signal and supplies the analog audio signal for output at a terminal t2.

Video signal processing circuit 24 corrects errors in the digital video signal and de-shuffles the signal in a manner well-known in the art, and supplies the resultant video data to D/A converter 27. D/A converter 27 converts the digital video data to an analog HD video signal and supplies the analog HD video signal to a mixing circuit 28 which combines the analog video signal with a synchronous signal and a VBI signal, to be discussed, and supplies the resultant analog HD video signal for output at a terminal t3.

System data processing circuit 25 generates from the VAUX, AAUX and subcode data a control signal (not shown) which controls the reproduction of the HD signal from the magnetic tape. System data processing circuit 25 (shown as AUX data processing circuit 5 in FIG. 6) extracts the CGMS data from the AAUX and VAUX data packs, and supplies the extracted CGMS data to a VBI encoder 30. VBI encoder 30 (shown as VBI encoder 6 in FIG. 6) converts the CGMS digital data to an analog VBI signal having the format shown in FIGS. 3A and 3B. The analog VBI signal is supplied to mixing circuit 28 which superimposes the VBI signal onto the analog HD video signal in the manner previously discussed. A synchronous signal generator 29 generates and supplies sync signals to mixing circuit 28 which inserts those sync signals into the analog HD video signal.

Referring now to FIG. 8, a digital video tape recorder 2, which is operable to record either a digital HD video signal or an analog HD signal as a digital HD signal on a magnetic tape is shown. A digital data stream representing an HD digital signal, such as the signal output from terminal t1 of VTR 1, is supplied to output terminal t11 and to a digital interface (I/F) 41 which performs error detection/correction on the digital bit stream and converts the digital bit stream to a digital signal having a data structure suitable for recording on a magnetic tape. Digital I/F 41 supplies the digital signal to a controller 42 which controls the switching of a switch SW, and digital I/F 41 also supplies the digital signal to switch SW which supplies the digital signal to either a delay circuit 44 or to a system data processing circuit 43. Controller 42 controls the operation of switch SW so that video and audio data are supplied via output terminal A of switch SW to delay circuit 44, and controls switch SW so that VAUX, AAUX and subcode data are supplied via output terminal B of switch SW to system data processing circuit 43. System data processing circuit 43 extracts the CGMS data from the VAUX and AAUX data packs and supplies to a gate circuit 46 a control signal indicative of whether the HD signal can be recorded on the magnetic tape or cannot be recorded on the magnetic tape. The control signal indicates the HD signal is recordable when the CGMS data indicates the HD signal is either partially copy protected or not copy protected, and indicates that the HD signal cannot be recorded when the CGMS data indicates that the HD signal is fully copy protected.

System data processing circuit 43 modifies the CGMS data to indicate that the HD signal is fully copy protected (e.g., a value of 11) when the CGMS data extracted from the supplied HD signal identifies the signal as a partially copy protected signal. The system data (i.e., the VAUX, AAUX and subcode data), including the CGMS data, is supplied to a mixing circuit 45 which combines the video and audio data (delayed by delay circuit 44) and the system data, and supplies the combined digital data to gate circuit 46.

Gate circuit 46 supplies the resultant digital signal to a recording signal processing circuit 47 when the control signal supplied from system data processing circuit 43 indicates that the HD signal can be recorded. On the other hand, when the control signal indicates that the HD signal cannot be recorded, gate circuit 46 is inhibited from supplying the digital HD signal.

In an alternative embodiment, system data processing circuit 43 supplies separate video and audio control signals to gate circuit 46 that identify whether the video and audio signals, respectively, can or cannot be recorded on a magnetic tape, and gate circuit 46 operates to supply both the video and audio data, either the video or audio data, or neither the video nor audio data in response to the video and audio control signals supplied thereto.

Recording signal processing circuit 47 digitally modulates the HD signal supplied from gate circuit 46 and supplies the modulated digital signal to head mechanism 13 which records the digital HD signal on a magnetic tape.

Digital video tape recorder 2 also is operable to receive an analog audio HD signal at a terminal t12 and to receive an analog video HD signal at a terminal t13, which are supplied from, for example, terminals t2 and t3 of digital video tape recorder 1, previously discussed. The analog audio HD signal is supplied to a gate circuit 48 which, in response to a control signal from a VBI decoder 51, supplies the analog audio HD signal to A/D converter 52 which converts the analog audio HD signal to a digital audio HD signal.

The analog HD video signal is supplied to an adjustment gain circuit (AGC) 49 which gain adjusts the analog video HD signal and supplies the gain adjusted signal to a gate circuit 50. The analog HD video signal also is supplied to VBI decoder 51 which produces therefrom the control signal and supplies the control signal to both gate circuits 48 and 50. Similar to gate circuit 48, gate circuit 50 supplies, in response to the control signal, the video HD signal to A/D converter 54 which converts the analog HD video signal to a digital HD video signal. Audio and video signal processing circuits 53, 55 perform various processes on the respective digital audio and video data, such processes including shuffling and error detection/correction. The processed audio and video data are supplied from circuits 53, 55 to a mixing circuit 56 which combines the data supplied thereto.

VBI decoder 51 (shown as VBI decoder 16 in FIG. 6) extracts from the analog HD video signal the VBI signal, extracts from the extracted VBI signal the CGMS information, and generates from the CGMS information the control signal that is supplied to gate circuits 48, 50. When the CGMS information indicates that the HD signal is fully copy protected, VBI decoder 51 controls gate circuits 48 and 50 to not supply the respective audio and video signals to A/D converters 52, 54. On the other hand, when the extracted CGMS information indicates that the HD signal is partially copy protected or not copy protected, VBI decoder 51 controls circuits 48, 50 to supply the respective audio and video signals to A/D converters 52, 54. In other words, the analog HD signal (video and audio) is recordable on a magnetic tape when the VBI signal inserted therein indicates that the HD signal is not fully copy protected.

VBI decoder 51 further supplies the extracted CGMS information, as well as data words W0-W7, to system data processing circuit 43 which produces therefrom the VAUX, AAUX, and subcode data to be recorded with the video and audio digital data. System data processing circuit 43 (also shown as AUX data processing circuit 15 in FIG. 6) modifies the CGMS information to indicate that the HD signal is fully copy protected when the CGMS information supplied thereto indicates that the HD signal is partially copy protected.

System data processing circuit 43 supplies the VAUX, AAUX and subcode data as system data to mixing circuit 56 which combines the system data, the video data and the audio data, and supplies the resultant digital signal at a transmission rate of 40.5 Mbps (million bits per second) to recording signal processing circuit 47 which, as previously discussed, digitally modulates and amplifies the digital signal. The digital signal is supplied to head mechanism 13 which records the digital HD signal on the magnetic tape.

Figure 9A:
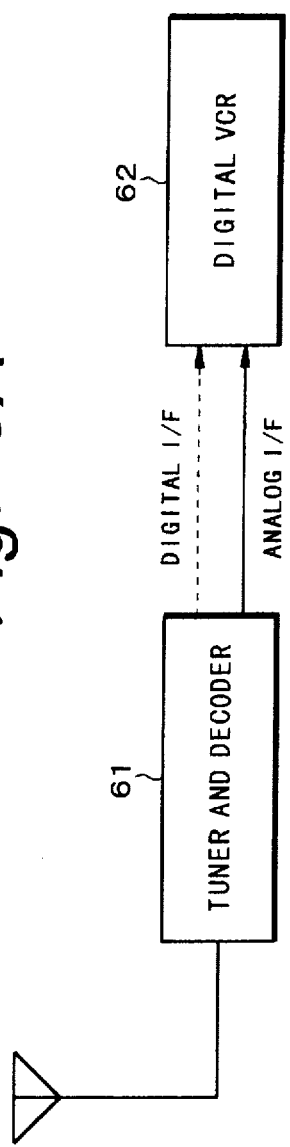
FIGS. 9A and 9B are block diagrams of apparatus for recording a video signal embodying the present invention which receives a transmitted broadcast program.

In addition to recording (i.e., dubbing) an HD signal that is reproduced by a digital video tape recorder embodying the present invention, the present invention also is applicable to recording and reproducing HD signals supplied from and transmitted to other devices. For example, FIG. 9 is a block diagram of a tuner and decoder 61 and digital VCR 62 both embodying the present invention. A digital broadcasting program is received by tuner and decoder 61 which tunes to a selected broadcast program having a copy protection signal included therein and supplies the selected broadcast program to digital VCR (VTR) 62 via either a digital I/F or an analog I/F.

Figure 9B:
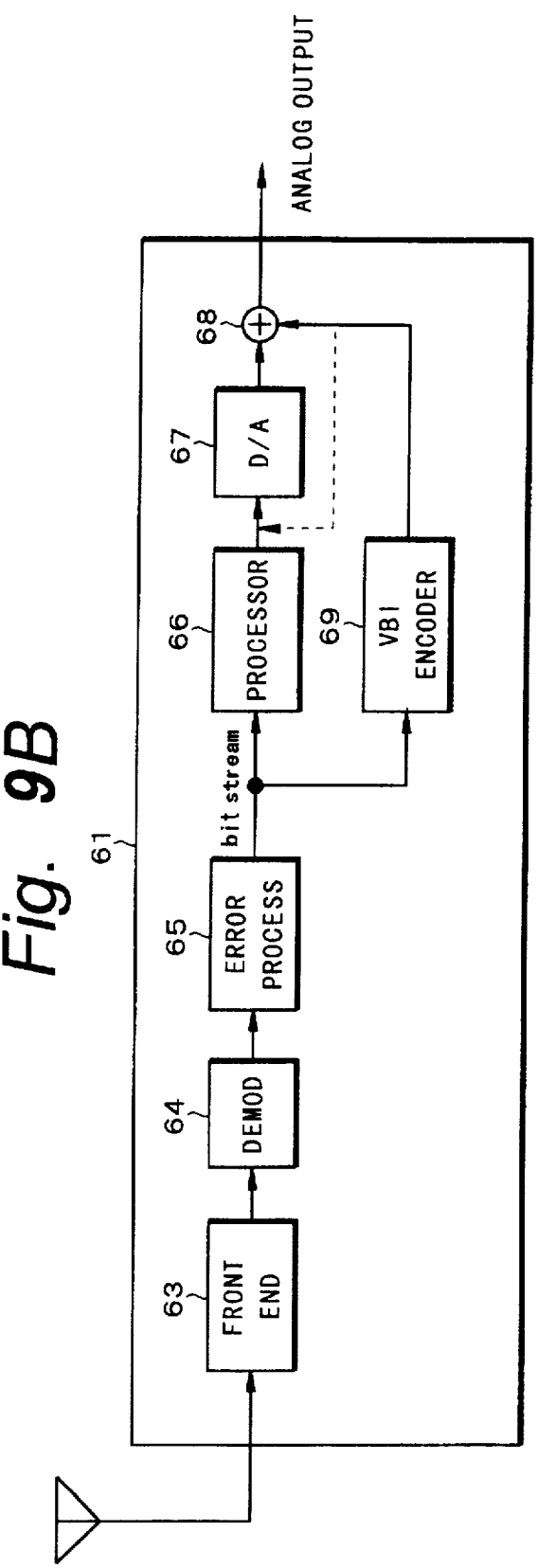

Tuner and decoder 61, shown in the detailed block diagram of FIG. 9B, is comprised of a front end circuit 63, a demodulator 64, an error processing circuit 65, a processor 66, a D/A converter 67, a mixing circuit 68 and a VBI encoder 69. The received broadcast signal is supplied to front end circuit 63, which includes a tuning circuit and a frequency converting circuit therein, and which tunes to a selected broadcast signal and frequency converts the selected broadcast signal, and supplies the frequency converted signal to demodulating circuit 64 which performs a demodulating operation corresponding to the so-called QPSK method, or QAM method, or other appropriate method, on the frequency converted signal and supplies the demodulated signal to error processing circuit 65. Error processing circuit 65 detects and corrects errors in the demodulated signal and provides the error corrected signal as a bit stream (e.g., having an MPEG format) to processor 66 and to VBI encoder 69. Processor 66 decodes the MPEG bit stream to provide a digital HD signal having therein both video and audio data. Processor 66 supplies the digital HD signal to D/A converter 67 which converts the digital HD signal to an analog HD signal and supplies the analog HD signal to mixing circuit 68.

VBI encoder 69 extracts CGMS data from the error corrected signal and generates therefrom a VBI signal having the format shown in FIGS. 3A and 3B. VBI encoder 69 supplies the VBI signal to mixing circuit 68 which superimposes the VBI signal onto the analog HD signal and supplies the resultant analog HD signal as an output. In an alternative embodiment, the VBI signal is combined with the digital HD output of processor 66, as represented by the dashed line in FIG. 9B, prior to converting the digital HD signal to an analog HD signal.

Tuner and decoder 61 supplies the analog HD signal to digital VTR 62 which operates in a manner similar to digital VTR 2, shown in FIG. 8 of the drawings. If the analog HD signal is not fully copy protected, as identified by the VBI signal, digital VTR 62 is operable to record the analog HD signal in digital form on a magnetic tape.

Figure 10:
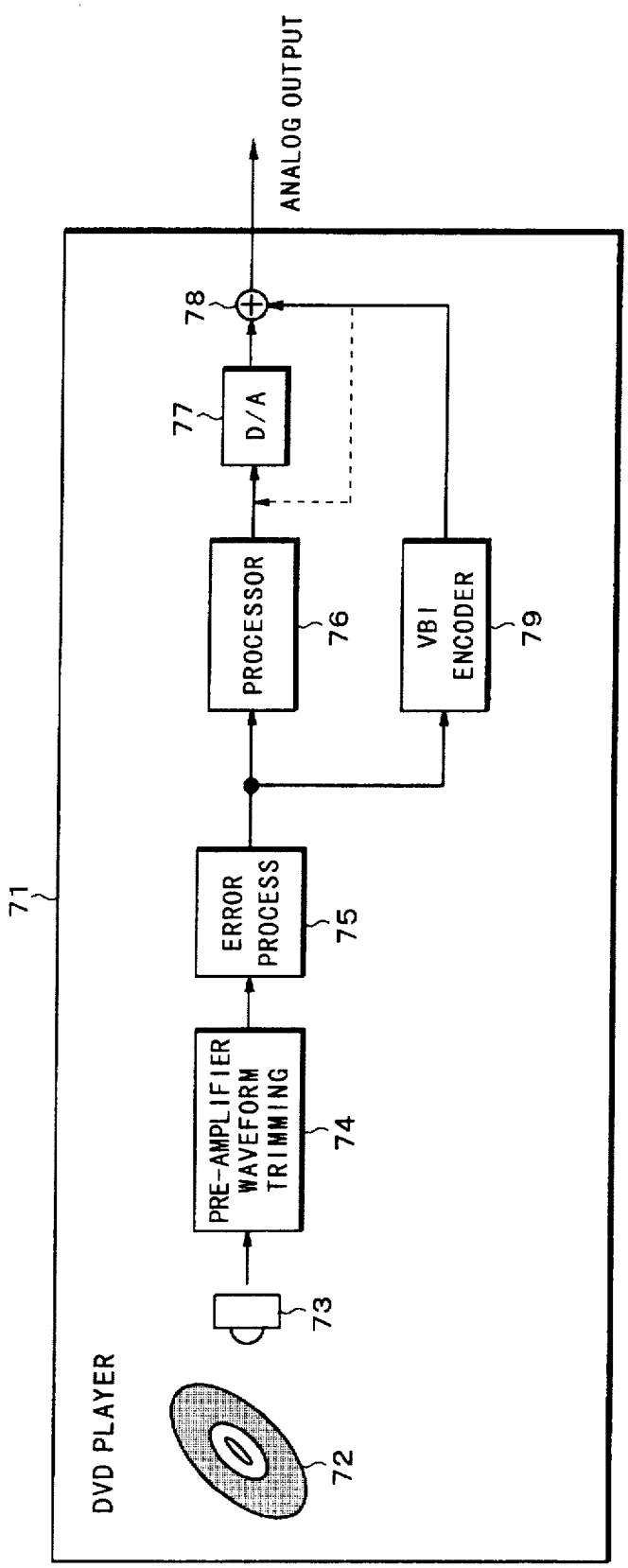
FIG. 10 is a block diagram of a digital video disk player embodying the present invention.

FIG. 10 illustrates a block diagram of a digital video disk (DVD) player 71 embodying the present invention. A compressed and encoded digital HD signal (e.g., having the MPEG format) is reproduced from a digital video disk (DVD) 72 by an optical pickup device 73 which supplies the reproduced signal to a pre-amplifier/waveform trimming circuit 74. Circuit 74 processes the reproduced signal in a manner well known in the art and supplies the processed signal to an error processing circuit 75 which detects and corrects errors in the processed signal and supplies the error corrected signal to processor circuit 76 and to a VBI encoder 79. Processor 76 generates from the processed reproduced signal a digital HD signal and supplies the digital HD signal to a D/A converter 77. The digital HD signal is converted to an analog HD signal and supplied to a mixing circuit 78. VBI encoder 79 extracts from the processed reproduced signal CGMS data, produces a VBI signal therefrom and supplies the VBI signal to mixing circuit 78. Mixing circuit 78 superimposes the VBI signal onto the analog HD signal and supplies the superimposed analog HD signal as an output signal. In an alternative embodiment, the VBI signal is combined with the digital HD signal output from processor 76 and the combined signal is converted to an analog HD signal by D/A converter 77. The analog HD signal output from DVD player 71 may then be recorded on a magnetic tape by, for example, digital VTR 2, discussed above.

Figure 11:
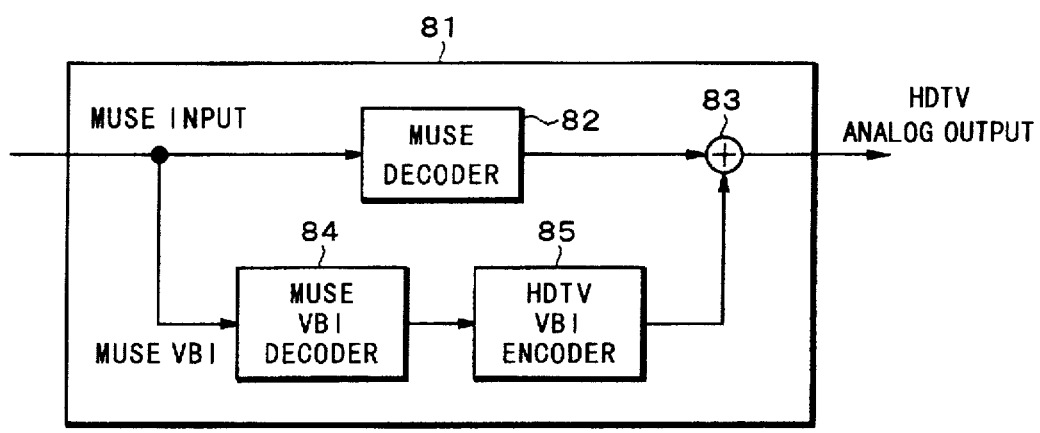
FIG. 11 is a block diagram of a MUSE converter embodying the present invention.

FIG. 11 is a block diagram of a MUSE converter 81 embodying the present invention and which is comprised of a MUSE decoder 82, a mixing circuit 83, a MUSE VBI decoder 84 and an HDTV VBI encoder 85. As is known, MUSE is an analog transmission format in which an HD signal is band-compressed before it is transmitted. A MUSE signal, supplied from a broadcasting station, a MUSE VCR, a MUSE disc unit, etc., is supplied to both MUSE decoder 82 and MUSE VBI decoder 84. MUSE decoder 82 decodes the MUSE signal and supplies the decoded MUSE signal as an analog HD signal to mixing circuit 83. MUSE VBI decoder 84 extracts from the MUSE signal a MUSE VBI signal and supplies the MUSE VBI signal to HDTV VBI encoder 95 which produces therefrom an HD VBI signal, such as shown in FIGS. 3A and 3B. The HD VBI signal is supplied to mixing circuit 83 which combines the analog HD signal and the HD VBI signal, and supplies the combined analog HD signal as an output to, for example, digital VTR 2 shown in FIG. 8.

Figure 12:
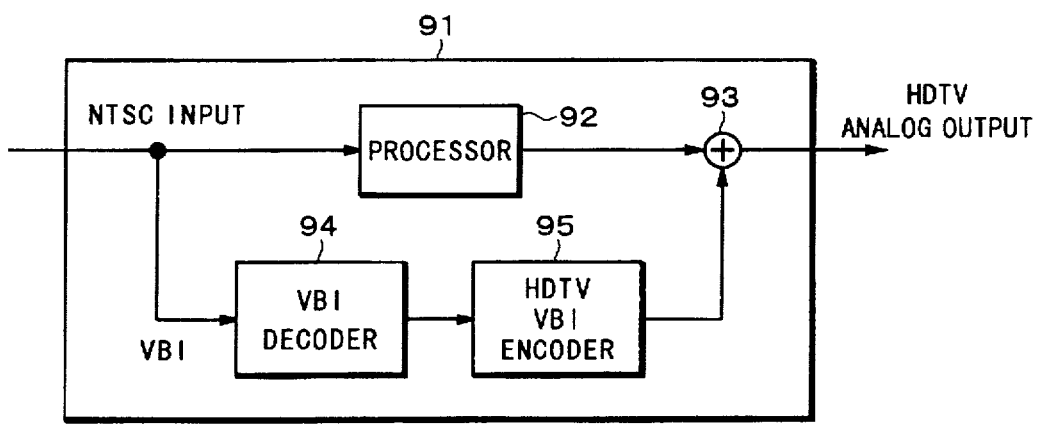
FIG. 12 is a block diagram of a standard to high definition video signal converter embodying the present invention.

FIG. 12 is a block diagram of an NTSC high definition converter 91 embodying the present invention, and which is comprised of a processor 92, a mixing circuit 93, a VBI decoder 94 and an HDTV VBI encoder 95. An NTSC video signal is supplied to processor 92 which "up-converts" the NTSC signal into an HD signal. Processor 92 generally is comprised of an interpolator, a motion detector and a frame memory for carrying out the up-converting process, although other appropriate circuits may be used, as is well known in the art. Processor 92 supplies the HD signal to mixing circuit 93. The NTSC signal also is supplied to VBI decoder 94 which extracts therefrom a VBI signal, extracts from the VBI signal CGMS information and supplies the CGMS information to HDTV VBI encoder 95. Encoder 95 generates from the CGMS information an HD VBI signal and supplies the HD VBI signal to mixing circuit 93. Mixing circuit 93 combines the VBI signal with the analog HD signal and supplies the resultant signal to, for example, a digital VTR embodying the present invention.

Although the present invention has been particularly shown and described in conjunction with preferred embodiments thereof, it will be readily appreciated by those of ordinary skill in the art that various changes may be made without departing from the spirit and scope of the invention. For example, although copy protection data has been described as being stored as CGMS data in particular VAUX and AAUX data packs in the digital HD signal, the present invention is not limited to this specific data structure and may be applied to other data structures in which copy-protection data is stored in a different manner.

As another example, although the present discussion is directed to recording and reproducing a high definition video signal, the present invention is not limited solely to this type of signal format and may be widely applied to the recording and reproducing of various other non-standard video signals.

Therefore, it is intended that the appended claims be interpreted as including the embodiments described herein, the alternatives mentioned above, and all equivalents thereto.

What is claimed is:

1. Apparatus for processing a high definition video signal having copy-prevention information included therein, comprising:

receiving means for receiving a digital high definition video signal having said copy-prevention information;

extracting means for extracting said copy-prevention information from said digital high definition video signal;

generating means for generating from said extracted copy-prevention information an analog copy-inhibit signal having a data format of another copy-inhibit signal superimposed on a standard definition video signal;

means for converting said digital high definition video signal to an analog high definition video signal; and adding means for adding said analog copy-inhibit signal to said analog high definition video signal.

2. The apparatus of claim 1, wherein said adding means superimposes said analog copy-inhibit signal onto said analog high definition video signal to produce a superimposed analog high definition video signal.

3. The apparatus of claim 1, wherein the digital high definition video signal includes video data, audio data and system data, said system data including said copy-prevention information; and said extracting means extracts said copy-prevention information from said system data included in said digital high definition video signal.

4. The apparatus of claim 1, wherein said digital high definition video signal includes video image data, video auxiliary data, audio sound data and audio auxiliary data; and said extracting means extracts said copy-prevention information from at least one of said video auxiliary data and said audio auxiliary data.

5. The apparatus of claim 4, wherein said video auxiliary data and said audio auxiliary data are comprised of packs of data having a common pack structure.

6. The apparatus of claim 1, wherein said adding means is operable to add said analog copy-inhibit signal to a vertical blanking interval of said analog high definition video signal.

7. The apparatus of claim 1, wherein said extracting means includes means for providing said digital high definition video signal without said copy-prevention information as an additional signal; and said adding means adds said analog copy-inhibit signal to said additional signal.

8. The apparatus of claim 1, wherein said copy-prevention information identifies whether said digital high definition video signal is fully copy-protected, partially copy-protected, or not copy-protected.

9. The apparatus of claim 1, wherein said receiving means is comprised of reproducing means for reproducing said digital high definition video signal from a record medium.

10. Apparatus for processing an analog high definition video signal having a copy-inhibit signal superimposed thereon, comprising:

extracting means for extracting from said analog high definition video signal a copy-inhibit signal identifying said analog high definition video signal as copy-protected or not copy-protected and having a data format of another copy-inhibit signal superimposed on a standard definition video signal;

supplying means for supplying said analog high definition video signal as a supplied high definition video signal when said copy-inhibit signal identifies said analog high definition video signal as not copy-protected;

generating means for generating from the extracted copy-inhibit signal digital copy-prevention data having a data format different than a data format of said copy-inhibit signal;

means for converting the supplied high definition video signal to a digital high definition video signal; and combining means for combining said digital copy-prevention data and said digital high definition digital video signal to produce an output high definition video signal.

11. The apparatus of claim 10, further comprising means for recording the output high definition video signal on a record medium.

12. The apparatus of claim 10, wherein said combining means combines said digital copy-prevention data to said digital high definition video signal to produce said output high definition video signal.

13. The apparatus of claim 10, wherein said copy-inhibit signal is superimposed on said analog high definition video signal in a vertical blanking interval thereof.

14. The apparatus of claim 10, wherein said generating means is operable to generate digital video auxiliary data and digital audio auxiliary data; said digital copy-prevention data being included in at least one of said digital video auxiliary data and said digital audio auxiliary data; and said combining means combines said digital video auxiliary data and said digital audio auxiliary data to said digital high definition video signal to produce said output high definition video signal.

15. The apparatus of claim 14, wherein said digital video auxiliary data and said digital audio auxiliary data each is comprised of packs of data having a common pack structure.

16. The apparatus of claim 10, wherein said copy-inhibit signal identifies said analog high definition video signal as fully copy-protected, partially copy-protected, or not copy-protected; and said supplying means supplies said analog high definition video signal as said supplied high definition video signal when said copy-inhibit signal identifies said analog high definition video signal as either partially copy-protected or not copy-protected.

17. The apparatus of claim 16, wherein said generating means generates digital copy-prevention data indicating said output high definition video signal as copy-protected when said copy-inhibit signal identifies said analog high definition video signal as either copy-protected or partially copy-protected.

18. Apparatus for reproducing from a record medium a digital high definition video signal having digital copy-prevention data therein, comprising:

means for reproducing said digital high definition video signal from said record medium;

means for extracting digital copy-prevention data from the reproduced digital high definition video signal;

means for generating from said extracted digital copy-prevention data an analog copy-inhibit signal having a data format of a copy-inhibit signal superimposed on a standard definition video signal;

means for converting the reproduced digital high definition video signal to an analog high definition video signal; and means for superimposing said analog copy-inhibit signal onto said analog high definition video signal to produce an analog output signal.

19. The apparatus of claim 18, wherein said means for converting converts the reproduced digital high definition video signal without said digital copy-prevention data to said analog high definition video signal.

20. Apparatus for recording a digital high definition video signal on a record medium, comprising:

means for receiving an analog high definition video having a copy-inhibit signal superimposed thereon, said copy-inhibit signal identifying said analog high definition video signal as copy-protected or not copy-protected and having a data format of a copy-inhibit signal superimposed on a standard definition video signal;

means for extracting said copy-inhibit signal from the received analog high definition video signal;

means for supplying the received analog high definition video signal as a supplied high definition video signal when said copy-inhibit signal identifies the received analog high definition video signal as not copy-protected;

means for converting the supplied high definition video signal to a digital high definition video signal;

means for generating from said extracted copy-inhibit signal digital copy-prevention data;

means for adding said digital copy-prevention data to the digital high definition video signal; and means for recording the digital high definition video signal having said digital copy-prevention data added thereto on a record medium.

21. The apparatus of claim 20, wherein said copy-inhibit signal identifies the received analog high definition video signal as either fully copy-protected, partially copy-protected, or not copy-protected; and said means for supplying supplies the received analog high definition video signal as a supplied high definition video signal when said copy-inhibit signal identifies the received analog high definition video signal as either partially copy-protected or not copy-protected.

22. The apparatus of claim 21, wherein said means for generating generates from said extracted copy-inhibit signal digital copy-prevention data indicating the digital high definition video signal as copy-protected when said copy-inhibit signal identifies the received analog high definition video signal as either copy-protected or partially copy-protected.

23. Method of processing a high definition video signal having copy-prevention information included therein, comprising the steps of:

receiving a digital high definition video signal having copy-prevention information therein;

extracting the copy-prevention information from the digital high definition video signal;

generating from the extracted copy-prevention information an analog copy-inhibit signal having a data format of another copy-inhibit signal superimposed on a standard definition video signal;

converting the digital high definition video signal to an analog high definition video signal; and adding the analog copy-inhibit signal to the analog high definition video signal.

24. The method of claim 23, wherein said adding step is carried out by superimposing said analog copy-inhibit signal onto said analog high definition video signal to produce a superimposed analog high definition video signal.

25. The method of claim 23, wherein the digital high definition video signal includes video data, audio data and system data, said system data including said copy-prevention information; and said extracting step is carried out by extracting said copy-prevention information from said system data included in said digital high definition video signal.

26. The method of claim 23, wherein said digital high definition video signal includes video image data, video auxiliary data, audio sound data and audio auxiliary data; and said extracting step is carried out by extracting said copy-prevention information from at least one of said video auxiliary data and said audio auxiliary data.

27. The method of claim 26, wherein said video auxiliary data and said audio auxiliary data are comprised of packs of data having a common pack structure.

28. The method of claim 23, wherein said adding step is carried out by adding said analog copy-inhibit signal to a vertical blanking interval of said high definition video signal.

29. The method of claim 23, further comprising the step of providing said digital high definition video signal without said copy-prevention information as an additional signal; and said adding step is carried out by adding said analog copy-inhibit signal to said additional signal.

30. The method of claim 23, wherein said copy-prevention information identifies whether said digital high definition video signal is fully copy-protected, partially copy-protected, or not copy-protected.

31. The method of claim 23, further comprising the step of reproducing said digital high definition video signal from a record medium.

32. Method of processing an analog high definition video signal having a copy-inhibit signal superimposed thereon, comprising the steps of:

extracting from said analog high definition video signal a copy-inhibit signal identifying said analog high definition video signal as copy-protected or not copy-protected and having a data format of another copy-inhibit signal superimposed on a standard definition video signal;

supplying said analog high definition video signal as a supplied high definition video signal when said copy-inhibit signal identifies said analog high definition video signal as not copy-protected;

generating from the extracted copy-inhibit signal digital copy-prevention data having a data format different than the data format of said copy-inhibit signal;

converting the supplied high definition video signal to a digital high definition video signal; and combining said digital copy-prevention data and said digital high definition digital video signal to produce an output high definition video signal.

33. The method of claim 32, further comprising the step of recording the output high definition video signal on a record medium.

34. The method of claim 32, wherein said combining step is carried out by combining said digital copy-prevention data to said digital high definition video signal to produce said output high definition video signal.

35. The method of claim 32, wherein said copy-inhibit signal is superimposed on said analog high definition video signal in a vertical blanking interval thereof.

36. The method of claim 32, wherein said generating step is carried out by generating digital video auxiliary data and digital audio auxiliary data; said digital copy-prevention data being included in at least one of said digital video auxiliary data and said digital audio auxiliary data; and said combining step is carried out by combining said digital video and audio auxiliary data and said digital high definition video signal to produce said output high definition video signal.

37. The method of claim 36, wherein said digital video auxiliary data and said digital audio auxiliary data each is comprised of packs of data having a common pack structure.

38. The method of claim 32, wherein said copy-inhibit signal identifies said analog high definition video signal as fully copy-protected, partially copy-protected, or not copy-protected; and said supplying step is carried out by supplying said high definition video signal as said supplied high definition video signal when said copy-inhibit signal identifies said high definition video signal as either partially copy-protected or not copy-protected.

39. The method of claim 38, wherein said generating step is carried out by generating digital copy-prevention data indicating said output high definition video signal as copy-protected when said copy-inhibit signal identifies said analog high definition video signal as either copy-protected or partially copy-protected.

40. Method of reproducing from a record medium a digital high definition video signal having digital copy-prevention data therein, comprising the steps of:

reproducing said digital high definition video signal from said record medium;

extracting digital copy-prevention data from the reproduced digital high definition video signal;

generating from said extracted digital copy-prevention data an analog copy-inhibit signal having a data format of a copy-inhibit signal superimposed on a standard definition video signal;

converting the reproduced digital high definition video signal to an analog high definition video signal; and superimposing said analog copy-inhibit signal onto said analog high definition video signal to produce an analog output signal.

41. The method of claim 40, wherein said converting step is carried out by converting the reproduced digital high definition video signal without said digital copy-prevention data to said analog high definition video signal.

42. Method of recording a digital high definition video signal on a record medium, comprising:

receiving an analog high definition video having a copy-inhibit signal superimposed thereon, said copy-inhibit signal identifying said analog high definition video signal as copy-protected or not copy-protected, and having a data format of a copy-inhibit signal superimposed on a standard definition video signal;

extracting said copy-inhibit signal from the received analog high definition video signal;

supplying the received analog high definition video signal as a supplied high definition video signal when said copy-inhibit signal identifies the received analog high definition video signal as not copy-protected;

converting the supplied high definition video signal to a digital high definition video signal;

generating from said extracted copy-inhibit signal digital copy-prevention data;

adding said digital copy-prevention data to the digital high definition video signal; and recording the digital high definition video signal having said digital copy-prevention data added thereto on a record medium.

43. The method of claim 42, wherein said copy-inhibit signal identifies the received analog high definition video signal as either fully copy-protected, partially copy-protected, or not copy-protected; and said supplying step is carried out by supplying the received analog high definition video signal as a supplied high definition video signal when said copy-inhibit signal identifies the received analog high definition video signal as either partially copy-protected or not copy-protected.

44. The method of claim 43, wherein said step of generating is carried out by generating from said extracted copy-inhibit signal digital copy-prevention data indicating the digital high definition video signal as copy-protected when said copy-inhibit signal identifies the received analog high definition video signal as either copy-protected or partially copy-protected.

* * * * *